Feb. 23, 1932.  J. F. LEANHART  1,846,974
CONDENSER FOR AUTOMOBILE RADIATORS
Filed Oct. 25, 1930
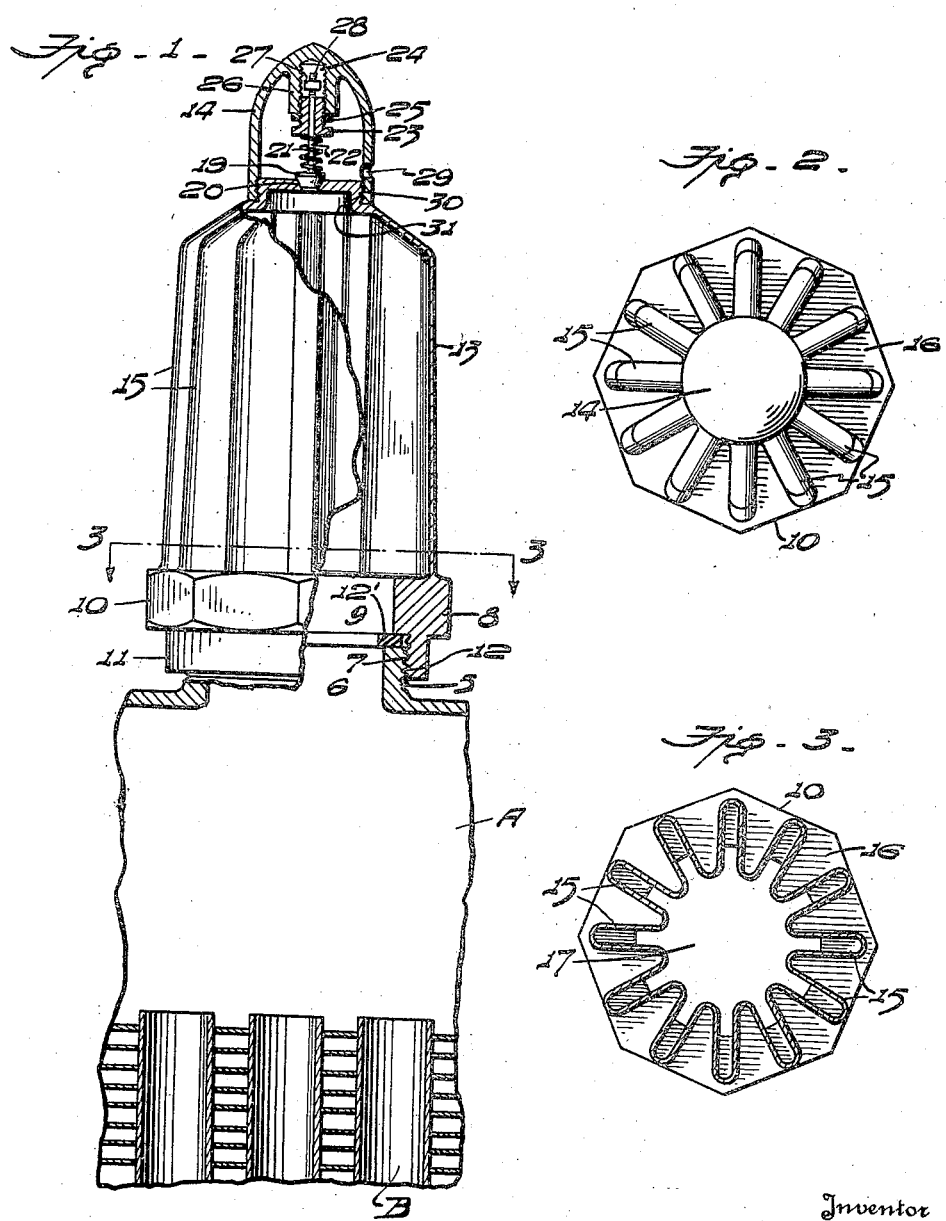
Inventor
Jacob F. Leanhart
By
Attorney Patented Feb. 23, 1932

1,846,974

UNITED STATES PATENT OFFICE

JACOB F. LEANHART, OF LOUISVILLE, KENTUCKY

CONDENSER FOR AUTOMOBILE RADIATORS

Application filed October 25, 1930. Serial No. 491,259.

This invention relates to a cap for the filling opening of an automobile radiator, and has for its main object to provide such a cap wherein steam and vapor emitted from fluid within the radiator of an automobile will be condensed and from which the condensate will flow back into the radiator, so that the fluid contents of said radiator will be prevented, for a maximum length of time, from evaporating to the atmosphere.

A further object of the invention is the provision of a device of this character, wherein the mixture of water and alcohol or other anti-freezing medium within the radiator of an automobile or a radiator of any internal combustion engine or the like will be preserved against undue evaporation, yet, if excess pressure occurs in the radiator, such pressure will be automatically relieved to prevent damage to the radiator.

A further object of the invention is the provision of a device of this character, which is extremely simple in construction, thoroughly reliable and efficient in use, strong, durable, neat and attractive in appearance, easy of application and removal, and inexpensive to manufacture.

With the foregoing and other objects in view, the invention will be described with reference to the accompanying drawings which show a preferred embodiment of the invention, and the novel features of same will be pointed out in the claim hereunto appended.

In the accompanying drawings:

Figure 1 is a vertical sectional view through an automobile radiator having a cap embodying the invention applied to the neck or cap engaging flange of the filling opening thereof, the cap being partly broken away;

Figure 2 is a top plan view of the cap; and

Figure 3 is a sectional view through the device on the line 3—3 of Figure 1, looking in the direction of the arrows.

Similar reference characters indicate corresponding parts throughout the several views in the drawings.

In Figure 1 there is shown a part of the upper portion A of an automobile radiator, which part rises above the water circulating core B, only a portion of the latter being shown. This upper part A is provided with the conventional filling nipple or neck 5 around the filling opening 6, through which the cooling medium or water is introduced into the radiator and upon which a closure cap is usually mounted by screw-threaded engagement, the threads on the exterior of the neck 5 being indicated at 7.

The condenser comprises a base 8, preferably made of metal, provided with a central opening 9 which preferably is of approximately the same diameter as the filling opening and the external periphery of the said base is preferably of polygonal outline as at 10, whereby the base may be turned, say by a wrench, in mounting it on the neck 5. The base 8 is provided with a depending rim 11 having internal threads 12 to receive the threads 7 on the neck 5 for securing the base on the neck 5, a gasket 12' being interposed between the latter and the base to effect a fluid tight joint therebetween. It is to be understood, however, that the base may be otherwise detachably mounted upon the nipple or neck 5 according to the manner in which the ordinary closure cap is secured to the radiator to which the device is to be applied.

An upwardly tapering crown 13 rises from the base 8, said crown terminating at its upper end in a peaked dome 14, the crown preferably being formed of thin sheet metal shaped to form vertically extending radial hollow fins or wings 15. The fins 15 are arranged around a central substantially cylindrical space 17 and by reason of the spaces 16 between said fins the cap presents a large surface area to the atmosphere. The cap thus forms a condensing chamber in direct communication with the radiator through the filling opening 6 of the radiator and the opening 9 in the base 8 of the cap. The upper end of the cap is imperforate and seals the upper end of the crown and the spaces 16 between the fins 15 are open upwardly through the top of the crown around the dome 14.

The base 8, crown or hood 13 and dome 14 may also be cast or otherwise formed of such size and of such thickness of material as may be deemed necessary or desirable.

To assure confinement of the cooling medium within the radiator and to avoid the possibility of the escape of steam or vapor therefrom to the outer atmosphere under normal pressure, a check valve 19 is provided, preferably seated in the top of the crown in a seat 20. To prevent the discharge of the medium through the ordinary overflow tube of the radiator, the said overflow tube may be plugged at any point, preferably at its top, or may be removed bodily from the radiator. This check valve 19 is urged to its seat 20 by the spring 21, and the stem 22 of said valve is guided in the bushing 23 which is screwed into a threaded bore 24 in the lug 26 as shown. A lock nut 25 also screwed on the outside of the bushing 23 and bearing against the end of the lug 26, serves to secure the bushing 23 at any desired adjusted position, whereby the tension of the spring 21 may be regulated as desired. A nut 27 is screwed on the threaded end 28 of the stem 22 and serves to prevent the said stem from leaving the bore of the bushing 23. A vent 29 is provided near the lower end of the dome 14, and allows the escape of any vapor or condensed liquid which may enter the dome 14. The dome is secured to the crown 13 by means of screw threads 30 which cooperate with the threads 31 of the crown.

The cap of the present invention replaces the closure cap for the filling nipple or neck 5 of the radiator and when, during the running of the engine, the fluid within the radiator to which the cap is attached expands or steam or vapor is generated above the upper part A of the radiator, the liquid may expand or the steam or vapor generated may rise into the crown or hood 13, and the atmospheric air surrounding the exterior of the device will impinge upon the fins or wings 15 to reduce the temperature of the expanded fluid or condense the steam or vapor and return same to the radiator without the escape or loss of the contents of the radiator. Thus the contents of the radiator will be preserved for a maximum length of time and evaporation of same will be reduced to a minimum.

The condenser will also augment the cooling action of the radiator upon the fluid contents of the latter, and thus reduce to a minimum the steaming and vaporization of the fluid, as well as prevent evaporation of same.

Since the fins or wings 15 extend longitudinally of the crown or hood 13 the full length of the latter, maximum radiation surface is exposed to the atmosphere, and since the upper ends of the air gaps 16 between the fins or wings 15 open through the top of the crown or hood 13 free circulation of air above the condenser is assured.

The spring 21 is of sufficient strength to maintain the valve 19 against its seat until the pressure within the radiator rises to a degree sufficient to overcome said spring to permit the relief of the excess pressure. The tension of the spring 21 may be adjusted as desired by means of the bushing 23, and when correct it may be secured against accidental displacement by means of the lock nut 25. Thus the pressure at which the radiator will blow off is adjusted, the setting preferably being as high as is safe, whereby the condensing effect is increased and less evaporation of the cooling medium takes place.

The vent 29 is located in such position that the driver may see it while operating the automobile, so that he will know at once when vapor or liquid is being discharged therefrom, and thus will know when the engine becomes overheated.

What is claimed is:

A condenser of the character described, comprising a base having a central opening and provided with means for engagement with the filling opening of the radiator of an internal combustion engine, a hollow body rising from said base, said body having a plurality of vertically disposed hollow fins extending radially therefrom and having at its upper end a neck towards which the upper ends of said fins converge and provided with a central opening and a valve seat on its upper side communicating with said opening, a dome mounted on said neck, said dome having an outlet opening in its wall and a hollow lug depending from its top in axial alignment with said valve seat, a bushing vertically adjustable in said lug and having an axial aperture, a valve movable toward and away from said valve seat and having a stem extending through the aperture in said bushing, and a spring surrounding said stem with its opposite ends bearing, respectively, against said valve and the lower end of said bushing.

In testimony whereof I have hereunto set my hand.

JACOB F. LEANHART.